J. A. SHEARER.
MACHINE FOR MAKING BUTTER.
APPLICATION FILED OCT. 11, 1919.

1,343,091.

Patented June 8, 1920.

INVENTOR
John Alexander Shearer.
BY *Munn & Co*
ATTORNEYS.

UNITED STATES PATENT OFFICE.

JOHN ALEXANDER SHEARER, OF HENLEY BEACH, SOUTH AUSTRALIA, AUSTRALIA, ASSIGNOR OF ONE-THIRD TO RICHARD HARRY NIEHUUS, OF ST. PETERS, SOUTH AUSTRALIA, AUSTRALIA, AND ONE-THIRD TO STANLEY CHARLES MELLOR, OF FULHAM, SOUTH AUSTRALIA, AUSTRALIA.

MACHINE FOR MAKING BUTTER.

1,343,091.        Specification of Letters Patent.      Patented June 8, 1920.

Application filed October 11, 1919. Serial No. 330,053.

*To all whom it may concern:*

Be it known that I, JOHN ALEXANDER SHEARER, a subject of the King of Great Britain and Ireland, residing at The Esplanade, Henley Beach, State of South Australia, Commonwealth of Australia, have invented certain new and useful Improved Machines for Making Butter, of which the following is a specification.

My improved machine has been devised for use for the purpose of churning cream into butter.

My machine comprises a rotatable vertical spindle having a horizontal disk upon its upper end; a table for the receptacle, having at its center a downwardly projecting pin rotatable in a socket in the horizontal disk near its edge and having a projecting arm connected to or slidable about the top of a stationary post; means for imparting a rotary motion to the vertical spindle with the horizontal disk; and a suitable frame or base carrying the said vertical spindle and the stationary post.

In order that my invention may be clearly understood I will now describe the same with reference to the accompanying drawings in which:—

Figure 1:
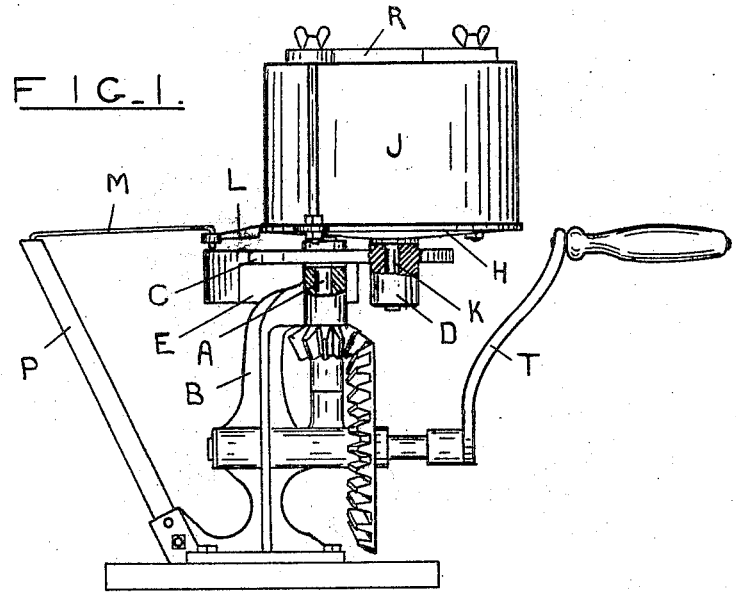
Figure 2:
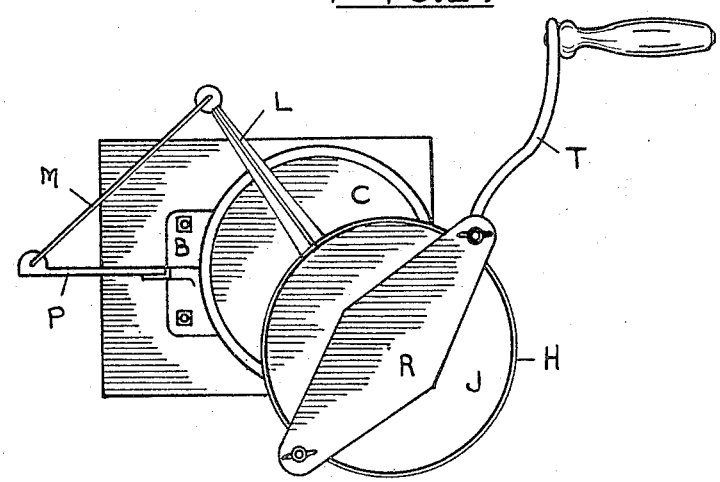

Figure 1 is a front view partly in section and Fig. 2 is a plan view of the preferred form of my machine.

The vertical spindle A is held upright by a bearing in a frame or base B the lower end of the spindle preferably being supported upon a ball to permit it to revolve with a minimum of friction.

The horizontal disk C is secured at its center to the upper end of the vertical spindle A and has on one side near its edge a socket D adapted to take the vertical pin of the table H and at the opposite side a counterweight E to partially balance the and receptacle.

The table H, which carries the receptacle J for the cream, has at its center upon its underside a projecting pin K which fits neatly into the socket D of the horizontal disk, and has an arm L projecting from one side which is connected by a link M to the top of a post P some little distance beyond the edge of the table and of approximately the same height as the table. Upon the top side of the table is a flange and clamping bolts and cross plate R whereby the receptacle is securely held in place.

The means shown in the drawings for rotating the horizontal disk C comprise a bevel gear wheel upon the spindle A engaged by a bevel gear wheel upon one end of a horizontal spindle which has upon its other end a handle T.

The post P is fastened by screws or other means to the frame or base B or it may be formed integral with the base. The base is shown fastened to a block to facilitate its attachment upon a bench.

The operation of churning cream with my machine is as follows: The cream is placed in the receptacle J and the receptacle securely fastened upon the table H by means of the clamping bolts and plate R. The vertical spindle A is rotated by means of the horizontal spindle and gear wheels. The table H and receptacle J are thereby caused to travel rapidly in a circular path around the top of the spindle A and at the same time an oscillatory motion is given to them by the connection of the projecting arm L to the top of the stationary post P. The contents of the receptacle are thereby subjected to a violent agitation and the butter is produced in a very short time.

What I claim is:—

1. A machine for the purpose set forth comprising in combination; a vertical spindle having upon its upper end a horizontal disk; a table for the receptacle, with means for securing the receptacle thereon, having at about its center a downwardly projecting pin rotatable in a socket in the horizontal disk near its edge, and having a projecting arm connected to the top of a stationary post; means for rotating the vertical spindle and horizontal disk; and a suitable frame or base carrying the said vertical spindle, the stationary post and the means for rotating the vertical spindle, substantially as described.

2. In a machine for the purpose set forth; in combination a horizontal disk secured upon the upper end of a vertical spindle supported in a stationary frame or base and having at one side a vertical socket and at the opposite side a counterweight; and a table supported by a depending central pin which fits into and rotates in the socket in the horizontal disk and having a projecting arm connected to the top of a stationary post also carried by the stationary frame or base, said table having means whereby the receptacle is attached thereto; substantially as described.

In testimony that I claim the foregoing as my invention I have signed my name in the presence of two subscribing witnesses this 18th day of August, 1919.

JOHN ALEXANDER SHEARER.

Witnesses:
ARTHUR GORE COLLISON,
KATHLEEN MARY COLLISON.